Jan. 8, 1963     H. R. UHTENWOLDT     3,071,990

TRANSMISSION

Filed July 19, 1961     3 Sheets-Sheet 1

INVENTOR.
HERBERT R. UHTENWOLDT
BY
ATTORNEYS

Jan. 8, 1963  H. R. UHTENWOLDT  3,071,990
TRANSMISSION
Filed July 19, 1961  3 Sheets-Sheet 2

INVENTOR.
HERBERT R UHTENWOLDT
BY Howard P Keiser
& John F Verhoeven
ATTORNEYS

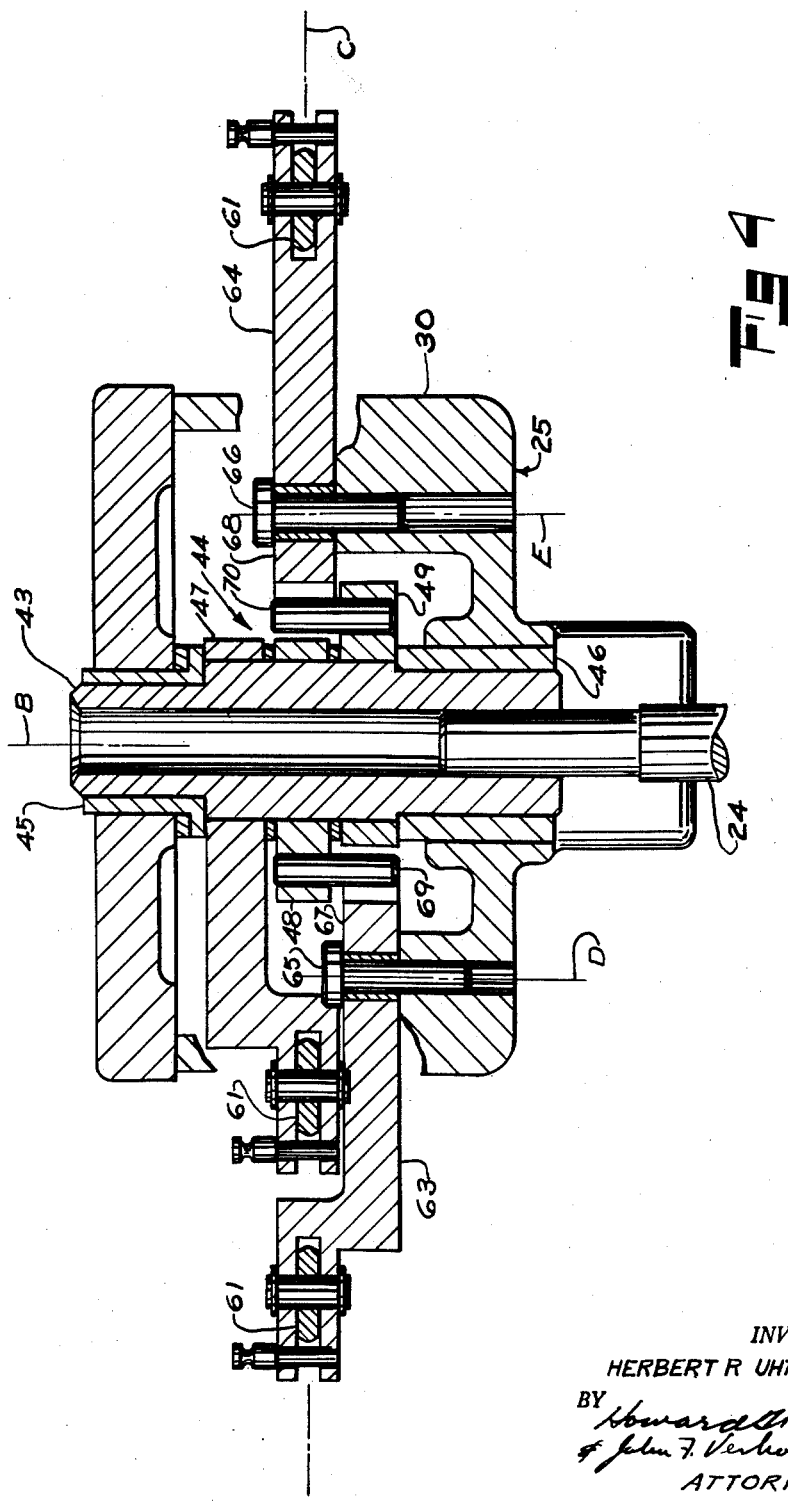

3,071,990
TRANSMISSION
Herbert R. Uhtenwoldt, Wilmington, Ohio, assignor to The Cincinnati Milling Machine Co., Cincinnati, Ohio, a corporation of Ohio
Filed July 19, 1961, Ser. No. 126,844
3 Claims. (Cl. 77—33.9)

The present invention relates to a transmission particularly suitable for use in a machine tool.

In one type of transmission an overrunning clutch mechanism is employed to transmit motion from the input shaft (which is rotated at a constant angular speed) to the output shaft, and the amplitude of oscillation of the clutch mechanism (which is connected to drive the output shaft in one direction) is varied to vary the speed of the output shaft. In the present invention oscillation of the clutch mechanism is effected by at least one link connected to the clutch mechanism so that the oscillation of the clutch mechanism varies directly with the oscillation of the link, and the link is engaged, as by biasing, with the input shaft. The input shaft, which is continuously rotated, has one portion concentric with the axis of rotation of the shaft and another portion adjacent said one portion of varying eccentricity relative to said axis of rotaion. When the link is engaged with the eccentric portion of the shaft, the link is oscillated at an amplitude determined by the eccentricity of the input shaft at the plane of contact with the link. Since the amplitude of oscillation of the clutch mechanism is determined by the amplitude of oscillation of the link, the output shaft is driven at a speed determined by the eccentricity of the input shaft at the plane of contact with the link. When the eccentricity of the input shaft at the plane of contact with the link is changed, as by axially shifting the input shaft, the amplitude of oscillation of the link (and hence the speed of the output shaft) is changed. When the input shaft is shifted to present a smaller eccentricity to the link, the amplitude of oscillation of the clutch mechanism and link is accordingly diminished, and the output shaft is driven at the reduced speed with minimum noise and wear in the transmission. When the concentric portion of the shaft is presented to the link, there is no oscillation of the link and clutch mechanism.

Thus, in the present invention, where a varying eccentricity of the input shaft is utilized to effect a change of speed of the output shaft, it is at the input to the system (that is, at the contact between the input shaft and the link), and not at some intermediate point in the system, that the change is made to effect the change of speed of the output shaft. Consequently, at reduced speeds of the output shaft, the entire system beyond the input shaft is operating at reduced speeds, and noise and wear of the transmission is kept at a minimum. With a transmission having an input shaft of varying eccentricity, a range of speeds suitable for the feed system of a machine tool, such as a drilling machine, can be effectively obtained from a compact, relatively simple, and inexpensive mechanism.

It is therefore one object of the present invention to provide an improved transmission of the type employing an overrunning clutch mechanism to drive the output shaft which transmission is operable with minimum oscillation of the transmission members. It is another object of the present invention to provide a transmission of this type in which the change to the transmission to effect a change of speed is made at the input end of the transmission system so that at reduced speed of the output shaft the entire transmission behing the input end is operating at reduced speed. It is yet another object of the present invention to provide a compact, efficient transmission for the feed system of a machine tool, operable with minimum noise and wear.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a view in perspective of a drilling machine in which the present invention is incorporated;

FIG. 3 is a view taken on the line 3—3 of FIG. 2 with the input shaft lowered from the position shown in FIG. 2;

FIG. 4 is a view taken on line 4—4 of FIG. 3 with the links shown angularly displaced to show their configuration more clearly.

Figure 5:
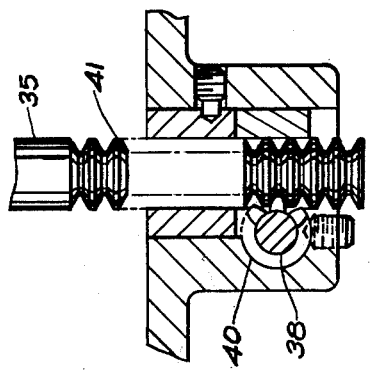
FIG. 5 is a view taken on the line 5—5 of FIG. 2.

There is shown in FIG. 1 a drilling machine having a motor 10 in housing 11 which drives pulley 12 and, through belt 13, drives a pulley 14 journaled in the housing 11. A spindle 15, which is journaled in quill 16 for axial movement therewith, is splined in pulley 14 for rotation thereby. The spindle 15 is adapted to carry a tool (not shown) at its lower end, and the quill 16, which is slidably received in the housing 11 for axial movement, is lowered and raised to move the tool into and out of the work by rotation of pinion gear 17 engaged with rack 18 on the quill. Pinion gear 17 is mounted fast on a shaft 19 which has a worm wheel 20 loosely mounted thereon. For power feed of the tool into the work, the worm wheel 20 is connected to shaft 19 through a clutch member 21 which has teeth (not shown) engaged with teeth (not shown) on the near face (as viewed in FIG. 1) of worm wheel 20. The clutch member 21 is mounted fast on a sleeve 22 keyed to shaft 19 and manually shiftable thereon for movement of the clutch member 21 into and out of engagement with worm wheel 20. When the clutch member 21 is disengaged from the work wheel, the shaft 19 can be manually rotated to raise the quill and withdraw the tool from the work; when the clutch member 21 is engaged with the worm wheel the quill is lowered, to power feed the tool into the work, at a rate determined by the rotation of worm wheel 20. During power feed, the worm wheel 20 is rotated by worm 23 which is driven from the output shaft 24 of a transmission 25 through sprockets 26, 27 received, respectively, on the worm 23 and output shaft 24, and the chain 28 connecting the sprockets.

Figure 2:
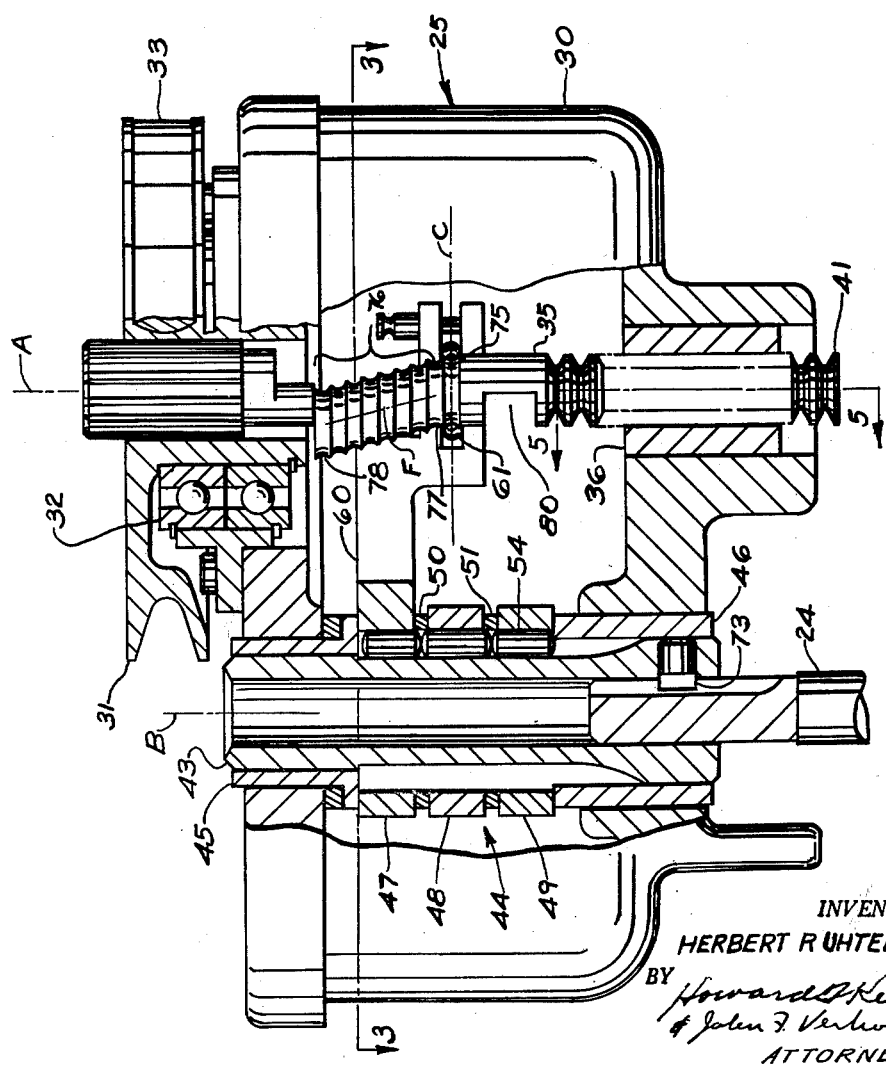
FIG. 2 is a view taken on the line 2—2 of FIG. 1 with two of the clutch mechanism links omitted for clarity.

As shown in FIG. 2, the transmission has a housing 30 on which a pulley 31 is rotatably mounted, in the annular ball bearings 32, for continuous rotation at a constant speed by belt 33, which is driven by a pulley 34 mounted on the spindle 15. The lower end of input shaft 35 of the transmission is received for rotation in a bushing 36 secured in the transmission housing, and the upper end of the input shaft is splined in pulley 31 for rotation of the input shaft about axis A at a constant angular speed. A control member 37 (see FIG. 1) comprises a shaft 38 journaled in the housing 30 having a knob 39 connected thereto outside the housing. The inner end of shaft 38 has a pinion 40 thereon, as shown in FIG. 5, engaged with rack teeth 41 on the lower end of input shaft 35. By rotation of knob 39, the input shaft 35 can be axially shifted up or down in the housing 30.

The upper end of the output shaft constitutes a sleeve 43 keyed, at 73, to the lower portion of the output shaft. The sleeve 43 is rotatably received in bushings 45 and 46 secured, respectively, in the top and bottom of the transmission housing 30, as shown in FIGS. 2 and 4. A clutch, or unidirectional drive mechanism, designated generally as 44, is mounted on the output shaft and includes three outer clutch members 47, 48, 49 received on the sleeve 43 between bushings 45 and 46 and separated by spacers 50 and 51. The sleeve 43, at the clutch members 47, 48, 49 is cut away, on opposite sides, to form with each outer clutch member two generally wedge-shaped slots 52 and 53, as shown best in FIG. 3. The clutch mechanism 44 includes a roller 54 received in each slot, and a spring 55, received in the sleeve 43 at each slot, normally urges the roller toward the narrow end of the slot and hence into engagement with the outer clutch member. When any one of the outer clutch members is rotated counterclockwise, as viewed in FIG. 3, the rollers, which tend to roll with the outer clutch member toward the narrow end of the wedge-shaped slot, lock the outer clutch member with the sleeve 43 to rotate the sleeve 43 counterclockwise during the entire counterclockwise rotation of the outer clutch member. When any one of the outer clutch members is rotated clockwise, as viewed in FIG. 3, the rollers tend to roll toward the large end of the wedge-shaped slot and exert no locking action between the sleeve 43 and the outer clutch members. Thus, any of the outer clutch members can rotate clockwise relative to the sleeve 43 and, when rotated in that direction, imparts no rotation to the output shaft. The oscillation of one outer clutch member therefore imparts a unidirectional intermittent rotation to the output shaft, and the oscillation of the three outer clutch members 47, 48, and 49 in sequential phase relation imparts a more steady unidirectional rotation to the output shaft.

The clutch mechanism 44 has three links 60, 63, 64 connected thereto. The link 60, which is pivotal about the axis of rotation B of the sleeve 43, is integral with outer clutch member 47 and terminates at its free, or outer, end in a plane C normal to the axis A of input shaft 35 as shown in FIGS. 2 and 4. The link has a roller 61 at its outer end, and the link is biased toward the input shaft 35 so that the roller is continuously engaged therewith. As shown best in FIG. 3, the outer clutch members 48 and 49 have links 63 and 64, respectively, connected thereto. The links 63 and 64 are not shown in FIG. 2, but, with link 60, are shown out of position in FIG. 4 to show more clearly their configuration. The links 63 and 64 are pivotally connected by pins 65 and 66 respectively, to the transmission housing 30 on axes D and E, respectively, and include arms 67 and 68 having a slotted outer end. The links 63 and 64 are connected to the outer clutch members 48 and 49, respectively, by pins 69 and 70 secured in the respective outer clutch members and received in the slots of arms 67 and 68. The links 63 and 64, which swing about axes D and E, respectively, terminate at their outer, or free ends in plane C, like link 60, and each has a roller 61 rotatably mounted therein similar to the roller 61 in link 60. As shown best in FIG. 3, the links 63 and 64 are shaped so that their rollers 61, together with the roller 61 of link 60, when biased against input shaft 35, engage that shaft in approximately equally spaced relation 120° apart around the shaft. Tension spring 71 between links 60 and 64, and tension spring 72 between links 63 and 64, serve to bias all links toward input shaft 35 and hold the link rollers in continuous engagement therewith.

The input shaft 35 has a portion 75 (see FIG. 2) concentric with the axis A of rotation thereof and when the control member 37 is set so that the portion 75 on the input shaft is in the plane C, no oscillation of the links 60, 63, 64 occurs, and hence the outer clutch members 47, 48, 49, are not oscillated. It will be noted that no portion of the transmission beyond the input shaft (which rotates continuously) is operated, and the output shaft is not rotated. Input shaft 35 has an eccentric portion 76 immediately above concentric portion 75, the eccentricity of which increases as it extends axially away from the concentric portion 75. Preferably, the input shaft is cut away, as at 80 to better balance the shaft. When the input shaft 35 is lowered slightly by control member 37 to place a slightly eccentric section of the input shaft, such as section 77, in the plane C, the links are oscillated slightly by the section 77 which orbits about the axis of rotation A of the shaft. The oscillation of each link causes oscillation of the outer clutch member to which it is connected, and the oscillation of the outer clutch members cause rotation in one direction of the output shaft 24. The links, which are engaged through their rollers 61 with the input shaft approximately 120° apart, reach their extreme position away from the axis A of the input shaft sequentially, each after 120° of rotation of the input shaft from the time the preceding link reached its extreme outer position, so that the links are oscillated in sequential phase relation. Thus, the outer clutch members are oscillated in sequence and the output shaft, which is rotated counterclockwise (as viewed in FIG. 3) as each clutch member is rotated counterclockwise by movement of its link away from the axis A, is rotated at a more constant rate by virtue of the plurality of outer clutch members operating in timed sequence.

It is desirable, for more steady rotation of the output shaft, not only that the links oscillate the outer clutch members in sequential cycles, but also that the outer clutch members are rotated the same amount by all the links. For the most compact design of the transmission, the ends of the links should be in a common plane, and since the links should be preferably spaced approximately 120° apart around the input shaft, two of the links, 63, 64, have been mounted on the transmission housing. The link 60 is connected directly to its outer clutch member 47 and that clutch member is rotated through the same angle as the angle through which link 60 swings about axis B from its extreme clockwise, or lower, position to its extreme counterclockwise, or upper, position (as viewed in FIG. 3). If the links 63 and 64 are made the same length as link 60, and the connection between the links and their respective outer clutch members (i.e., pins 69, 70) is midway between the axis B of rotation of the outer clutch members and the axes of rotation D and E of the respective links 63, 64, the clutch members 48, 49 will be rotated through angles equal to the angle through which clutch member 47 is rotated. It should be noted, however, that equal rotation of the outer clutch members can be obtained when one or more links are pivoted on the transmission housing even when the link members, for convenience of construction, are not the same length. Equal rotation of outer clutch members 47 and 48 will be achieved if the ratio between the distance from the pivot axis B of link 60 to the roller thereof and the distance from the pivot axis D of link 63 to the roller thereof is equal to the ratio between the distance from pivot axis B to pin 69 and the distance from pivot axis D and pin 69. Similarly, the rotation of outer clutch member 49 can be made equal to clutch member 47 even if link 64 is not the same length as link 60.

To increase the angular speed of the output shaft, the input shaft is shifted down by control member 37 to present a more eccentric section, such as section 78 of input shaft portion 76, to the rollers in plane C. It is section 78 of the input shaft which is shown presented to the rollers 61 (which remain in plane C) in FIG. 3 and with the more eccentric portion of the input shaft (which rotates at a constant angular speed) actuating the links, the amplitude (but not the frequency) of the oscillations of the links will be increased. Since the links are connected to the clutch mechanism, and that mechanism is operatively connected to the output shaft to grip the output shaft (through rollers 54 thereof) during all or substantially all counterclockwise rotation of the links and release the output shaft, for rotation of the links relative to the output shaft, on clockwise rotation of the links, the increased amplitude of the link oscillations will cause each link to impart a greater unidirectional rotation to the output shaft for each rotation of the input shaft, thereby increasing the speed of the output shaft. It should be noted that the surface of the eccentric portion 76 of the input shaft may be parallel to the central axis F of the eccentric portion (to provide an infinite number of sections normal to axis A for presentation to the rollers) or may be grooved, as shown, to provide a selected number of sections adapted for engagement by the rollers.

Thus it will be seen that the only change required in the transmission to change the speed of the output shaft is effected at the input shaft (by axial movement thereof) and that all other parts of the transmission behind the input shaft operate at speeds proportional to the speed of the output shaft. With this construction, wear and noise in the transmission is minimized when the output shaft is not rotated, or at low operating speeds of the output shaft. This mechanism, which is relatively inexpensive to manufacture and very compact compared to a geared transmission designed to give a corresponding range and number of speeds, is particularly well suited for use in the feed system of a machine tool, such as the drilling machine shown, where absolutely steady feed advance is not required.

What is claimed is:

1. A machine tool transmission comprising a housing, a rotatable input shaft having a portion concentric with the axis of rotation thereof and a portion of varying eccentricity relative to said axis, said input shaft journaled in the housing and axially shiftable therein, an output shaft journaled in the housing, a plurality of clutch members mounted on the output shaft each operable when rotated in one direction to rotate the output shaft therewith and each rotatable in the opposite direction relative to the output shaft, a plurality of pivotal links terminating at ends in angularly spaced relation around the axis of the input shaft, said ends lying in a common plane normal to the axis of the input shaft, each of said links connected to one of said clutch members to oscillate said clutch members as said links are oscillated and each of said links engaged with the input shaft for oscillation of the links when a section of the eccentric portion of the input shaft is in the plane of said ends of the links, and a control member operatively connected to the input shaft to shift said shaft axially and vary the amplitude of the oscillation of the links and the clutch members.

2. In a drilling machine having an axially movable quill and a tool spindle journaled therein for axial movement therewith, said machine tool having a motor, a transmission for connecting the quill to the motor for axial movement of the quill at a selected speed comprising in combination a housing, an input shaft journaled in the housing and operatively connected to the motor for rotation thereby, said input shaft having a portion concentric with the axis of rotation and a portion of increasing eccentricity extending axially from the concentric portion, an output shaft journaled in the housing operatively connected to the quill to move the quill axially as said output shaft is rotated, a plurality of pivotal links having rollers at their free ends in substantially equal angularly spaced relation around the axis of the input shaft, said rollers lying in a common plane normal to the axis of the input shaft, at least one of said links pivotal about the axis of the output shaft and at least one other of said links mounted in the housing for pivotal movement about an axis spaced from the axis of the output shaft, each of said links biased into contact with the input shaft for oscillation of the links in sequential phase relation when a section of the eccentric portion of the input shaft is in the plane of the rollers, a plurality of overrunning clutch members mounted on the output shaft each operable when oscillated to rotate the output shaft in one direction intermittently, each overrunning clutch member connected to one of the links for oscillation thereby in accordance with the oscillation of said link, and a control member operatively connected to the input shaft to shift said shaft axially and vary the amplitude of oscillation of the links and clutch members.

3. A machine tool transmission comprising a housing, a rotatable input shaft having a portion concentric with the axis of rotation thereof and a portion of varying eccentricity relative to said axis, said input shaft journaled in the housing and axially shiftable therein, an output shaft journaled in the housing, a plurality of clutch members mounted on the output shaft each operable when rotated in one direction to rotate the output shaft therewith and each rotatable in the opposite direction relative to the output shaft, a plurality of pivotal links terminating at their free ends in angularly spaced relation around the input shaft, said free ends lying in a common plane normal to the axis of the input shaft and biased into engagement therewith for oscillation when a section of the eccentric portion of the input shaft is in the plane of the free ends of the links, at least one of said links pivotal around the axis of the output shaft and at least one other of said links pivotal around and axis spaced from said output shaft, each of said links connected to one of said clutch members to oscillate said clutch members as said links are oscillated, and a control member operatively connected to the input shaft to shift said shaft axially and vary the amplitude of the oscillation of the links and the clutch members.

References Cited in the file of this patent

UNITED STATES PATENTS

| 1,602,416 | Sherman | Oct. 12, 1926 |
| 2,521,711 | Galliano | Sept. 12, 1950 |